US005200088A

United States Patent [19]
Pilznienski

[11] Patent Number: 5,200,088
[45] Date of Patent: Apr. 6, 1993

[54] REMOVAL OF HEXAVALENT CHROMIUM FROM WASTE MATERIAL

[75] Inventor: John F. Pilznienski, Dearborn Hts., Mich.

[73] Assignee: Kolene Corporation, Detroit, Mich.

[21] Appl. No.: 730,106

[22] Filed: Jul. 15, 1991

[51] Int. Cl.$^5$ .............................................. C02F 1/62
[52] U.S. Cl. ..................... 210/720; 210/724; 210/727; 210/913; 423/55
[58] Field of Search ............... 210/719, 720, 723, 724, 210/725–727, 913; 423/55

[56] References Cited

U.S. PATENT DOCUMENTS

| | | | |
|---|---|---|---|
| 3,928,195 | 12/1975 | Hoeltgen et al. | 210/717 |
| 3,981,965 | 9/1976 | Gancy et al. | 423/55 |
| 4,259,297 | 3/1981 | Kaczur et al. | 210/913 |
| 4,260,491 | 4/1981 | Cassidy et al. | 210/720 |
| 4,671,882 | 6/1987 | Douglas et al. | 210/720 |
| 4,704,259 | 11/1987 | Lipsztajn | 423/55 |

FOREIGN PATENT DOCUMENTS

| | | | |
|---|---|---|---|
| 47-25088 | 10/1972 | Japan | 210/913 |
| 53-21078 | 2/1978 | Japan | 210/720 |

OTHER PUBLICATIONS

"Chromium (III) Hydrolysis Constants and Solubility of Chromium (III) Hydroxide" by Rai, et al., *Inorganic Chemistry*, vol. 26, 1987, pp. 345–349.

Primary Examiner—Peter Hruskoci
Attorney, Agent, or Firm—Calfee, Halter & Griswold

[57] ABSTRACT

A method of removing $Cr^{+6}$ from a solution is provided. In removing the $Cr^{+6}$, an effective amount of an alkali metal dithionite is added to the solution to reduce substantially all of the $Cr^{+6}$ to $Cr^{+3}$. A soluble material is provided in the solution which will form a precipitate. Further, the soluble material is selected such that it will coprecipitate and tie up any dissolved or colloidal $Cr^{+3}$ formed as a result of the reduction of the $Cr^{+6}$. In one embodiment, the solution is alkaline and preferably, the pH of the solution is reduced sufficiently such that the soluble material will quickly precipitate and form the coprecipitate material with the $Cr^{+3}$. Thereafter, the solution is filtered to remove the coprecipitated material from the solution and thereby form a supernatant solution suitable for waste discharge which has substantially lowered chromium values. The precipitate has the $Cr^{+3}$ tied up in an insoluble non-leachable form.

20 Claims, 2 Drawing Sheets 5,200,088

REMOVAL OF HEXAVALENT CHROMIUM FROM WASTE MATERIAL

BACKGROUND OF THE INVENTION

This invention relates generally to the treatment of waste materials for the reduction and removal of hexavalent chromium from an alkaline solution, and more particularly to the treatment of sludge and similar materials in which the hexavalent chromium is reduced to trivalent chromium and then removed as a coprecipitate.

In order to meet increasingly stringent environmental protection requirements and standards, it is becoming necessary to remove or at least significantly reduce many different materials which are generated during various manufacturing processes and are present in the waste effluent in some form. In the past, waste materials were often disposed of with little thought of their content of hazardous materials, thus causing serious contamination problems at many sites and in bodies of water. Hence, increasingly rigid requirements have been set for the control of many different types of hazardous material in waste products.

One material which can cause significant problems in waste disposal is chromium. Chromium can be present in several different forms, most frequently as a compound. The most hazardous of the forms of chromium is hexavalent chromium ($Cr^{+6}$). It is increasingly necessary to lower the chromium content to a few parts per million (ppm) or less in waste water or leachate. This is often done by chemically reducing the soluble hexavalent chromium ($Cr^{+6}$) to trivalent chromium ($Cr^{+3}$). This reduction of $Cr^{+6}$ to $Cr^{+3}$ does decrease the degree of hazard of the chromium to some extent. However, even the presence of $Cr^{+3}$ in waste material can also cause problems and indeed there are governmental regulations which impose limits on the content of total chromium that can be discharged as effluent. Thus, it is necessary to ensure that there is minimal chromium in any form being discharged as an effluent by removing it from the liquid discharge. To this end, it is also desirable to tie up the chromium in some insoluble form such that it will not leach out to any significant extent.

There have been several prior art proposals for the reduction of $Cr^{+6}$ to $Cr^{+3}$. One such proposal is described in U.S. Pat. No. 4,704,259 assigned to Tenneco Canada Inc. This patent discloses the reduction of soluble $Cr^{+6}$ in an aqueous chlorate solution to $Cr^{+3}$ by the use of sodium dithionite and thus forming $Cr^{+3}$ ions in the form of chromic hydroxide, which according to the patentee precipitates from the chlorate solution. This patent relies on the insolubility of the $Cr^{+3}$ compound and thus, is dependent upon the particular end product being insoluble and filterable or otherwise removable from the solution.

U.S. Pat. No. 3,981,965 assigned to Allied Chemical Corporation discloses the use of sodium dithionite to reduce $Cr^{+6}$ under alkaline conditions to treat waste residues. Again, this patent relies on the insolubility and filterability of trivalent chromium ($Cr^{+3}$) hydroxide.

However, it has been found that while some forms of $Cr^{+3}$ compounds may be insoluble to various degrees, nevertheless, under certain conditions $Cr^{+3}$ compounds indeed are not totally insoluble or appear to form colloids which, when filtered through conventional filters, pass through with the solution and thus are not effectively removed even with filtering. Hence, any reduction of $Cr^{+6}$ to $Cr^{+3}$, which does not significantly tie up the reduced $Cr^{+3}$ ions in a filterable precipitate, will not be completely effective in treating the waste water to a level acceptable for disposal.

SUMMARY OF THE INVENTION

According to the present invention, a method of removing $Cr^{+6}$ from a solution is provided. In removing the $Cr^{+6}$, an effective amount of an alkali metal dithionite is added to the solution to reduce substantially all of the $Cr^{+6}$ to $Cr^{+3}$. A soluble material is provided in the solution which will form a precipitate at reduced pH (from that of the alkaline solution). Further, the soluble material is selected such that it will coprecipitate and tie up any $Cr^{+3}$ compound formed as a result of the reduction of the $Cr^{+6}$. In one embodiment, the solution is alkaline, and preferably the pH of the solution is lowered such that the soluble coprecipitant quickly precipitates and forms the coprecipitate material with the $Cr^{+3}$ compound. The soluble material may be supplied either before or after or concomitant with the addition of the dithionite and preferably should be added before the pH is reduced. Thereafter, the solution and precipitate is filtered to remove the coprecipitated material from the solution and thereby form a supernatant solution suitable for waste discharge which has substantially lowered chromium values. The filtered solids (i.e. filtercake) contain essentially all of the chromium from the original waste tied up in an insoluble essentially non-leachable form.

DESCRIPTION OF THE PREFERRED EMBODIMENTS

Figure 1:
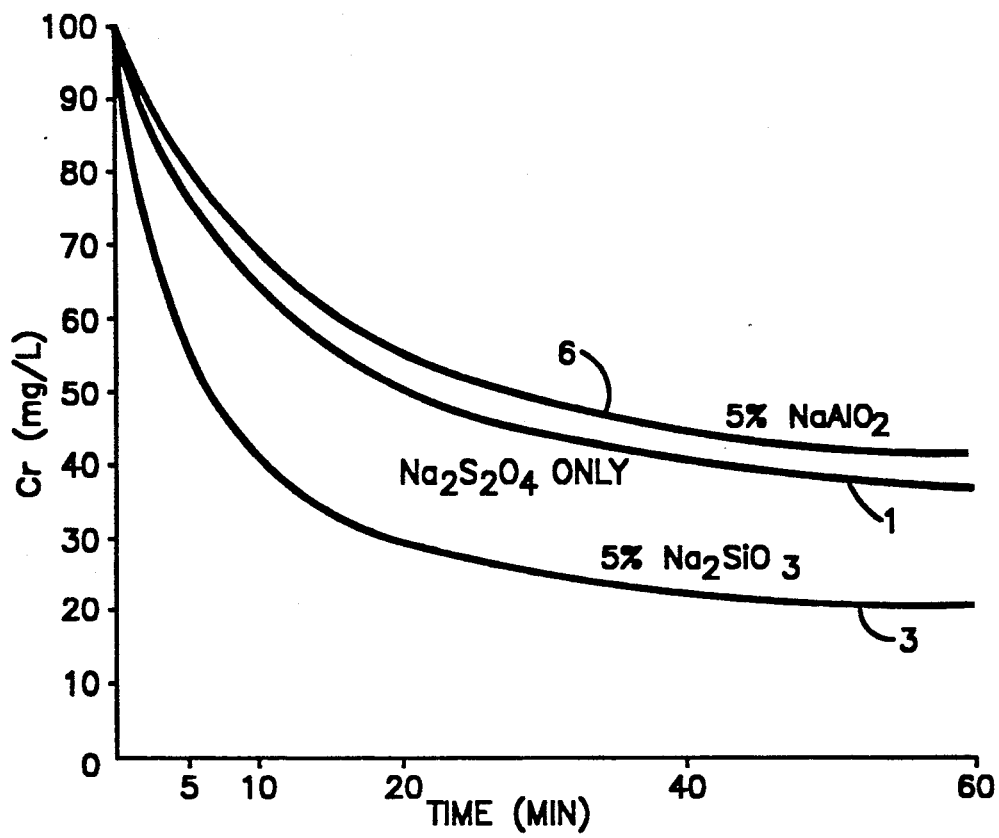
FIGS. 1, 2, and 3 are graphs of chromium levels in solution after various treatments at various time intervals.

The present invention provides generally for the removal of $Cr^{+6}$ from alkaline solutions. A particular and specific application of the present invention is in the treatment of sludges and rinse waters which result from various treatments of metals in fused salt baths. Such resulting sludges can occur from the descaling of metal, from the stripping of paint from metals, from the removal of cores and other remaining materials in investment castings and other types of castings, and similar metal treatments resulting in a sludge. These sludges have various components, many of which are hazardous to a greater or lesser extent when discharged untreated and, hence, in many cases, must be treated before discharge. One of the potentially hazardous chemicals as indicated above is chromium in either trivalent ($Cr^{+3}$) or hexavalent ($Cr^{+6}$) form, the $Cr^{+6}$ form being prevalent in the sludges. However, it should be understood that the treatment of $Cr^{+6}$ according to the present invention is not limited specifically to treatment of sludges generated by treatment of metals in fused salt baths, but is applicable broadly to other situations wherein $Cr^{+6}$ is contained in an alkaline solution.

The basic premise of the present invention is to reduce the $Cr^{+6}$ to $Cr^{+3}$ and assure that the $Cr^{+3}$ is precipitated as completely as possible as a filterable precipitate, after which the treated solution is filtered. The resulting filter cake presents a material which contains essentially insoluble chromium compounds. Thus, by forming the insoluble precipitate, the chromium is effectively removed from the solution and hence, from the waste water discharge.

In an initial test to develop a technique for reducing $Cr^{+6}$ and removing the reduced chromium, a "synthetic" sludge was formed to approximate a sludge which is similar to the type that would be formed when treating a metal in a commercial salt bath such as K-4, a heat treating salt sold by Kolene Corporation of Detroit, Mich., and which contains a major amount of sodium hydroxide as well as other active ingredients. A typical sludge formed from a fused salt bath treatment of metals by K-4 salt was approximated by mixing equal parts by weight of the K-4 salt with $Na_2CO_3$. $Na_2CO_3$ is the principal reaction product formed in certain types of treatment of metals. For example, the bath may be used electrolytically to oxidize carbonaceous contaminants such as graphite in cast iron thereby forming carbonates. Carbonates are also formed by reaction of the fused bath with carbon dioxide in the ambient atmosphere. When a fused salt, such as K-4 is used to treat metals containing chromium, a certain amount of chromium in the form of $Cr^{+6}$ will be found in the sludge, depending upon the amount of chromium originally present in the metal, the time of treatment, and various other factors. Therefore, to replicate the presence of chromium, three solutions of 10 grams of the synthetic sludge per liter of water were made by dissolving the synthetic sludge in water, and adding respectively, 1, 10, and 100 parts per million (ppm) of $Cr^{+6}$ ions. This was added as sodium chromate ($Na_2CrO_4$). Three solutions of 100 grams of the synthetic sludge per liter of water and containing respectively 1, 10, and 100 ppm of $Cr^{+6}$ were also prepared. The pH of the solutions was approximately 12.5.

Sodium dithionite ($Na_2S_2O_4$) was added to each of the solutions. It was assumed that a three to two mole ratio of $Na_2S_2O_4$ to $Cr^{+6}$ is the theoretical stoichiometric ratio to reduce all of the $Cr^{+6}$ to $Cr^{+3}$. This translates to a weight ratio of 5 parts $Na_2S_2O_4$ to one part of $Cr^{+6}$. In all further calculations given herein, it will be assumed that this stoichiometric ratio of 5 parts of $Na_2S_2O_4$ to one part of $Cr^{+6}$ is the theoretical stoichiometric amount required, and excesses added will be based on this stoichiometric amount. When using commercially available sodium dithionite, a ratio of 5.6 parts of commercial $Na_2S_2O_4$ to one part of $Cr^{+6}$ was used as the stoichiometric value since commercial grade sodium dithionite is only about 90% pure. Table I below gives the results for the reduction of $Cr^{+6}$ to $Cr^{+3}$ at various levels.

The sodium dithionite was added at approximately two times the stoichiometric equivalent as a powder and stirred into the solution and sampled after about 15 minutes had elapsed. A change from yellow to a greenish color was evident, indicating that the $Cr^{+6}$ was reduced to $Cr^{+3}$. The $Cr^{+6}$ was determined colorimetrically using 1, 5-diphenylcarbohydrazide (DPC) reagent. The results of adding the sodium dithionite to six different samples are shown in Table I below.

From an examination of Table I, it is apparent that there is a significant reduction of $Cr^{+6}$ in alkaline solution by the addition of sodium dithionite.

TABLE I

| Synthetic K-4 Sludge Conc. | $Cr^{+6}$ Originally Added | $Cr^{+6}$ 15 min. After Adding $Na_2S_2O_4$ |
|---|---|---|
| (1) 10 gm/L | 1 ppm | 0.38 ppm |
| (2) 10 gm/L | 10 ppm | 1.1 ppm |

TABLE I-continued

| Synthetic K-4 Sludge Conc. | $Cr^{+6}$ Originally Added | $Cr^{+6}$ 15 min. After Adding $Na_2S_2O_4$ |
|---|---|---|
| (3) 10 gm/L | 100 ppm | 0.2 ppm |
| (4) 100 gm/L | 1 ppm | 0.2 ppm |
| (5) 100 gm/L | 10 ppm | 0.1 ppm |
| (6) 100 gm/L | 100 ppm | 0.4 ppm |

It is believed that the equation for the reduction of $Cr^{+6}$ to $Cr^{+3}$ by sodium dithionite in alkaline solution is as follows:

$$3Na_2S_2O_4 + 2Na_2CrO_4 + 2NaOH + 2H_2O \rightarrow 2Cr(OH)_3 + 6Na_2SO_3$$

This equation indicates that 1.5 moles of $Na_2S_2O_4$ is required to reduce one mole of $Cr^{+6}$. Also, it should be noted that the hydroxide and water which are present in large excesses will tend to drive the reaction to completion; i.e. reduce the $Cr^{+6}$ to $Cr^{+3}$. In order to determine optimum speed of reaction and to drive the reaction to completion, experiments were performed to determine the rate of reaction and the completeness of reaction using various amounts of sodium dithionite to reduce $Cr^{+6}$ starting at 10 parts per million in one liter of solution utilizing the synthetic sludge (as defined above). It will be understood that a part per million or ppm is equivalent to one milligram per liter of solution. From an examination of Table II below, it is apparent that significant reduction takes place in a reasonable amount of time, at about three times the stoichiometric quantity required. Thus, in alkaline solutions without other interfering and competing reactions, it is preferred that at least three times the stoichiometric quantity of sodium dithionite be used to reduce the $Cr^{+6}$ to $Cr^{+3}$. A preferred amount is about 3.5 times the theoretical amount.

TABLE II

| | Concentration of $Cr^{+6}$ in Synthetic Sludge* SYNTHETIC SLUDGE (10 grams sludge per liter) | | | |
|---|---|---|---|---|
| (Approx.) Stoichiometric Qty. $Na_2S_2O_4$ | 5 Min. | 15 Min. | 1 Hour | 18 Hours |
| | After Adding $Na_2S_2O_4$ | | | |
| 1 × | 8.0 ppm | 8.0 ppm | 7.5 ppm | 7.7 ppm |
| 2 × | 3.5 ppm | 2.6 ppm | 1.9 ppm | 1.6 ppm |
| 3 × | 1.5 ppm | 1.0 ppm | 0.2 ppm | <0.05 ppm |
| 4 × | 0.8 ppm | 0.4 ppm | N.D. | Not run |
| 5 × | 0.3 ppm | 0.2 ppm | N.D. | Not run |
| 10 × | <0.05 ppm | N.D. | Not run | Not run |

*Starting material had 10 ppm $Cr^{+6}$ added
N.D. = None detected by analytical methods used It should be noted that the above experiments indicate the effectiveness of reducing $Cr^{+6}$ toe $Cr^{+3}$ but do not give any indication of the physical form or condition in which the $Cr^{+3}$ exists; i.e. they do not indicate whether the $Cr^{+3}$ is present as a precipitate or in solution or as a colloid. Thus, the only indication of the above experiments is that sodium dithionite is effective to reduce $Cr^{+b}$ to $Cr^{+3}$ in an alkaline solution.

In a continuation of the experiments to eliminate $Cr^{+6}$ and chromium in general from the waste water, samples of sludge which was actual sludge generated during fused salt bath cleaning operations of stainless steel investment casings to remove core material utilizing the previously indicated K-4 salt were utilized. Table III below indicates the concentration of various elements and material in the sludge and in the quench water used to cool the cleaned castings.

TABLE III

| K-4 Sludge | | |
|---|---|---|
| NaOH - 67.9% | As - N.D. (1) | Hg - N.D. |
| Na$_2$CO$_3$ - 7.1% | Ba - 6 ppm | Se - N.D. |
| NaCl - 11.3% | Cd - N.D. | Ag - N.D. |
| NaF - 2.6% | Cr$_{total}$ - 222 ppm | Cu - 41 ppm |
| H$_2$O-insol - 1.9% | Cr$^{+6}$ - 196 ppm | Ni - 25 ppm |
| Si - 5.9% | Pb - N.D. | Zn - 15 ppm |
| K-4 Quench Water | | |
| NaOH - 176 gm/L | As - N.D | Hg - N.D. |
| Na$_2$CO$_3$ - 29 gm/L | Ba - N.D. | Se - N.D. |
| Si - 5.9 gm/L | Cd - N.D. | Ag - N.D. |
| T.D.S. (2) - 274 gm/L | Cr$_{total}$ - 165 ppm | Cu - 9 ppm |
| S.G. (3) ≈ 1.21 | Cr$^{+6}$ - 165 ppm | Ni - N.D. |
| | Pb - N.D. | Zn - 2 ppm |

(1) N.D. = None detected by analytical methods used.
(2) Total Dissolved Solids
(3) Specific Gravity A test was run on the quench water shown in Table III in which 200 ml of the quench water were placed in a beaker and treated with 3.5 times stoichiometric equivalent of sodium dithionite to reduce the Cr$^{+6}$ to Cr$^{+3}$. The initial Cr$^{+6}$ was measured to be 165 ppm. Five minutes after treatment, there was no detectable Cr$^{+6}$. After 48 hours, the treated material was filtered through a 0.45 micron membrane filter. The filtrate, i.e. the supernatant fluid that passed through the filter, was measured by inductively coupled plasma (ICP) spectroscopy to determine the amount of chromium present. The filtrate showed 110 ppm of total chromium.

The filtered solution which had a pH of about 13.9 was then acidified with H$_2$SO$_4$, reducing the pH to about 9.0. After reducing the pH to 9.0, a thick grayish green gel-like floc formed. The resulting material was then filtered through Whatman #541 paper which is about 98% effective in removing material greater than about 20-25 microns. This size filter approximates rather closely a typical commercial filter for this type of material. Despite the rather coarse filter, the resulting filtrate water was clear and no chromium could be detected by ICP.

Following this, a second test was performed using a 100 grams per liter solution of the sludge in Table III. Hexavalent chromium concentration was checked and found to be 19.9 ppm. About 3.5 times the stoichiometric requirement of sodium dithionite was added to this solution. After 5 minutes, there were 2.2 ppm of Cr$^{+6}$ and after 15 minutes, there was 0.5 ppm Cr$^{+6}$ indicating that the chromium had all been essentially reduced to Cr$^{+3}$. After this resulting treated solution stood for two days, the treated solution was filtered through a 0.45 micron membrane. The filtered liquid showed 15 ppm total chromium content by ICP. Following this, the pH of the solution, which at this point was 13.5, was lowered to about 9.5 with the addition of concentrated H$_2$SO$_4$. The material became quite thick but further stirring thinned it out to a free flowing flocculent slurry. This was then filtered and the resulting filtrate solution was clear and colorless and the total chromium content was measured at about 0.1 ppm by ICP. Thus, practically all of the chromium was tied up as an insoluble material in the filter cake. Repeated tests on the sludge described in Table III produced similar results.

It is not certain whether the chromium remaining in the filtrate water after reduction is in true solution or is a colloidal suspension of chromium compounds. Polyhydroxylic and polymeric chromium hydroxide species exhibiting variable and complex solubilities over certain pH ranges have been described in several articles; e.g. see Rai, et al., Inorganic Chemistry, 1987, Vol. 26, pp. 345-349 and Spiccia, Inorganic Chemistry, 1988, Vol. 27, pp. 432-434. The Tyndall test, which entails shining an intense narrow light beam through the filtrate, was performed on this filtrate and others, and in some instances gave the characteristic diffusion of the light associated with colloids. In other experiments, the light scatter characteristic of the Tyndall effect was not observed, indicating that the chromium is in true solution. In any event, significant amounts of the chromium in whatever form, does pass through conventional filters after being reduced from Cr$^{+6}$ to Cr$^{+3}$, and thus, must be treated before filtering to insolubilize it.

It is theorized that by the reduction of the pH by the adding of acid, a precipitate is formed of some material in the solution which causes the Cr$^{+3}$ (either colloidal or in solution) to coprecipitate with this precipitate as a larger filterable material. Further, it is believed that the material which is caused to precipitate at the reduced pH is a silica gel or hydrated silicic acid derived from sodium silicate. Sodium silicate is present as indicated by the presence of silicon in the sludge analysis and is generated during the removal of siliceous core material from investment castings, according to the following reaction:

$$SiO_2 + 2NaOH \rightarrow Na_2SiO_3 + H_2O$$

It has been found that it is possible to achieve reduction of Cr$^{+6}$ to Cr$^{+3}$ and to precipitate the Cr$^{+3}$ in an alkaline solution without lowering the pH. However, it requires several times as much dithionite, and a much longer time. In tests performed on sludge sample solutions formed from a sludge having a composition as shown in Table IV (below) which solution has initially 11 ppm of chromium (Cr$^{+6}$) and 2.88 grams per liter silicate, it took thirty-five times the theoretical stoichiometric amount of dithionite and many hours of time to lower the chromium content to a level at which it was no longer detectable.

TABLE IV

| Inorganic Compounds Present (in weight %) | |
|---|---|
| Alkali hydroxides | 25.3 |
| Alkali carbonates | 29.9 |
| Alkali nitrates | 24.8 |
| Alkali nitrites | 0.0 |
| Alkali silicates | 2.4 |
| Water insolubles | 5.4 |
| Metals Present (in parts per million) | |
| Arsenic | Not detected |
| Barium | 104 |
| Cadmium | 5 |
| Chromium | 106 |
| Copper | 340 |
| Lead | 275 |
| Mercury | Not detected |
| Nickel | 29 |
| Selenium | Not detected |
| Silver | Not detected |
| Zinc | 350 |

In comparison, a similar sludge solution which contained 10 ppm chromium and 2.88 grams per liter silicate ion was treated with four times the theoretical amount of dithionite required, and then neutralized to a pH of about 8.6. After 20 minutes, the chromium content was lowered to 1.5 ppm and after 90 minutes it was lowered to about 0.12 ppm.

In order to study the effects of different variables on the reduction of $Cr^{+6}$, and the precipitation of chromium according to the present invention, synthetic sludges of the composition used in Tables I and II were utilized to which were added the theoretical amount of chromium to give nominal values of 100 ppm of $Cr^{+6}$. Each of the samples was then treated with about 3.5 times the stoichiometric amount of $Na_2S_2O_4$ needed to reduce the $Cr^{+6}$ to $Cr^{+3}$, with various different experimental conditions as shown in Table V and the amount of the total chromium in the filtrate solution was measured by ICP after filtration of solution through 0.45 μm filter at various time intervals as shown in Table V below.

In the case of Samples 1 and 2, no coprecipitant was used. In the other samples, either 2% or 5% (based on the weight of the synthetic sludge) of either $Na_2SiO_3$ or $NaAlO_2$ was used as a coprecipitant. In the case of Samples 1, 3, and 6, the pH of the solution was allowed to remain at this initial starting level, i.e. about 12.3 to 12.5. In the other samples, the pH was lowered such that the solution was just slightly alkaline, i.e. in the range of 8.1 to 9.1. In some cases, i.e. Samples 5 and 12, the pH was lowered before the addition of the coprecipitant, and in the other cases, the pH was lowered after the addition of the coprecipitant.

TABLE V

| Sample No. | Coprecipitant | pH | Cr value after (min) Mg/l(d) | | | | |
|---|---|---|---|---|---|---|---|
| | | | 5 | 10 | 20 | 60 | 90 |
| 1 | None | 12.6(a) | 79 | — | 54 | 37 | 30 |
| 2 | None | 8.1(b)* | 83 | — | 78 | 57 | 47 |
| 3 | 5% $Na_2SiO_3$ | 12.5(a) | 55 | — | 29 | 21 | — |
| 4 | 5% $Na_2SiO_3$ | 9.1(c) | 4.0 | — | 1.7 | 1.2 | 0.74 |
| 5 | 5% $Na_2SiO_3$ | 9.0(b) | 38 | — | 22 | 10 | 8.0 |
| 6 | 5% $NaAlO_2$ | 12.3(a) | — | 70 | 61 | 42 | 39 |
| 7 | 5% $NaAlO_2$ | 8.9(c) | — | 2.2 | 1.4 | 1.3 | 1.5 |
| 8 | 2% $Na_2SiO_3$ | 8.6(c) | — | 14 | 12 | 9.2 | 8.7 |
| 9 | 2% $NaAlO_2$ | 8.8(c) | — | 2.9 | 2.3 | 1.7 | 1.5 |
| 10 | 5% $Na_2SiO_3$ | 8.7(c) | 4.4 | 3.2 | 2.5 | — | — |
| 11 | 2% $Na_2SiO_3$ | 8.8(c) | 14 | 11 | 9.4 | — | — |
| 12 | 5% $NaAlO_2$ | 8.8(b) | 4.5 | 4.8 | 3.6 | 2.5 | — |
| 13 | 2% $NaAlO_2$ | 8.6(c) | 2.7 | 2.3 | — | — | — |
| 14 | 5% $NaAlO_2$ | 8.4(c) | 1.5 | — | — | — | — |

(a)pH of solution was left unaltered
(b)pH of the solution was lowered to value shown by the addition of $H_2SO_4$ before adding coprecipitant
(b*)pH of the solution was lowered to value shown by the addition of $H_2SO_4$ before adding dithionite
(c)pH of the solution was lowered to value shown by the addition of $H_2SO_4$ after adding coprecipitant
(d)determined by ICP after filtration through a 0.45 μm membrane filter Table IV above shows the total chromium level of the various samples after certain time intervals. In some cases, several data points, typically 5 minutes, 10 minutes, 20 minutes, 60 minutes, and 90 minutes, are shown. In some cases, fewer data points (in the case of sample 14, just one data point) were measured. Also, in some cases data points longer than 90 minutes were measured. However, for commercial applications, the most significant time is the reaction which has taken place in less than about 60 minutes, and those are the ones which are shown.

Figure 2:
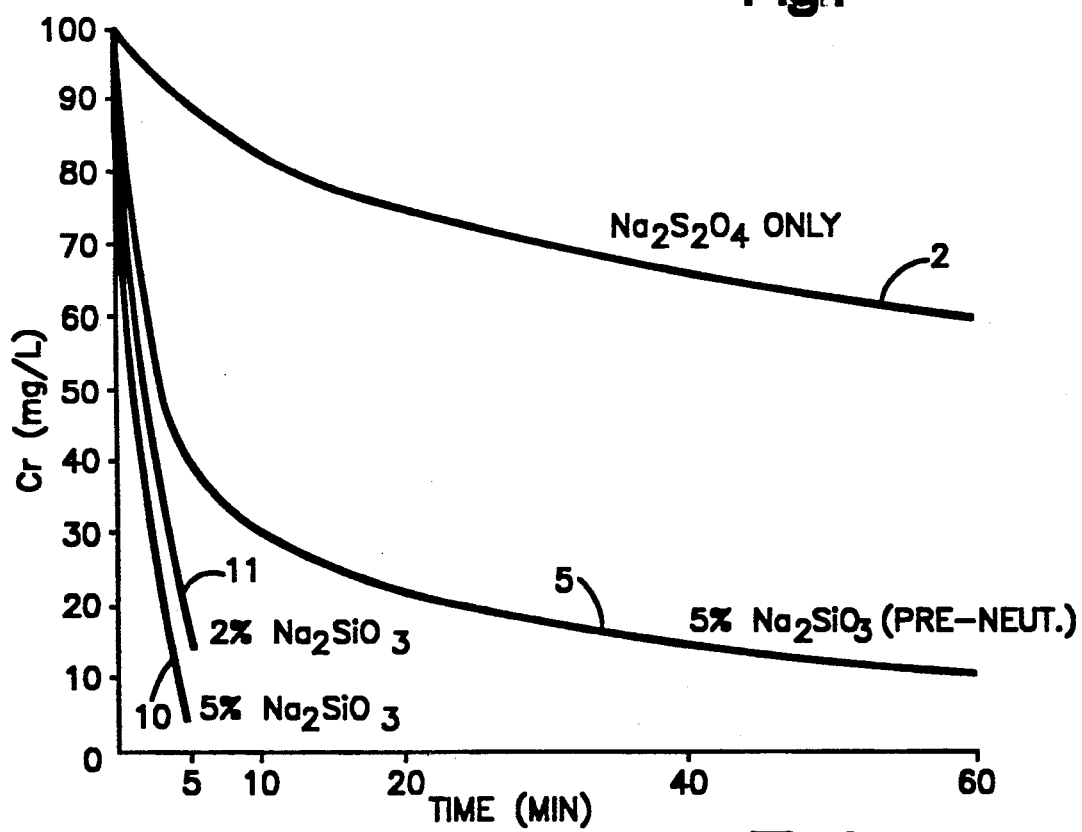
Figure 3:
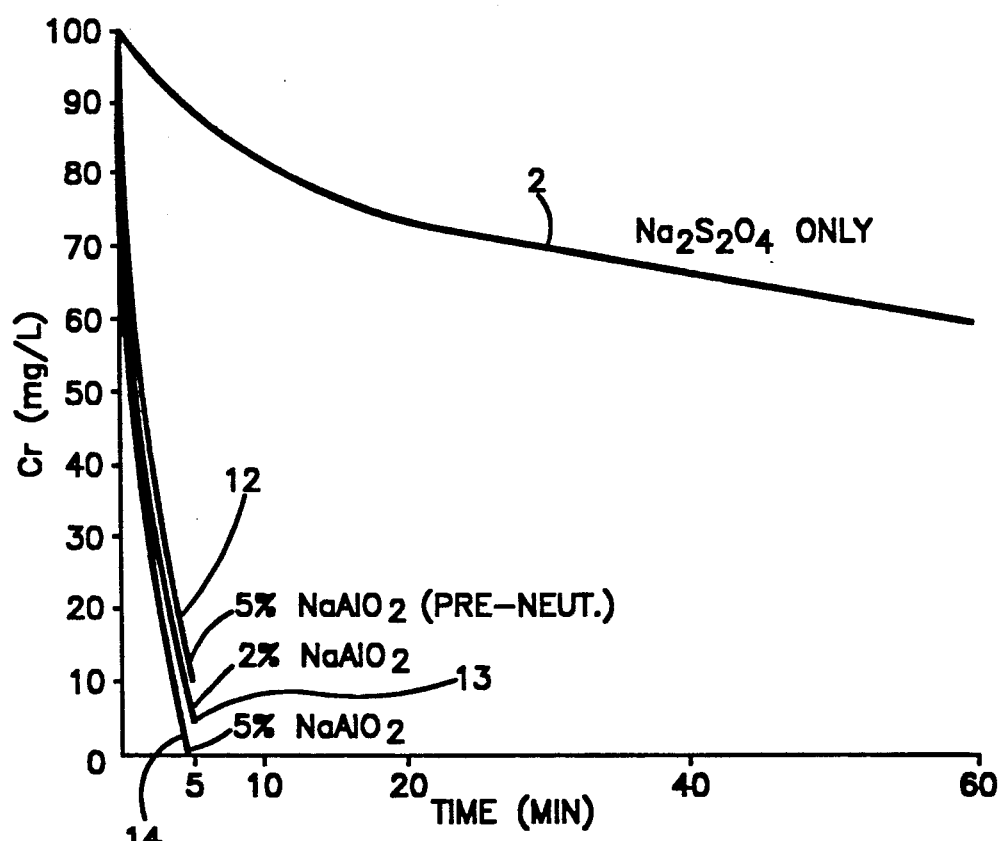

The results listed in Table V are shown in the graphs in FIGS. 1, 2, and 3, which graphs chart the chromium removal in the time up to 60 minutes. FIG. 1 shows the effect of not lowering the pH at all. FIG. 2 shows the effect of adding $Na_2SiO_3$ as a coprecipitant as compared to no coprecipitant at lowered pH levels. FIG. 3 shows the effect of adding $NaAlO_2$ as a coprecipitant at lowered pH levels are compared to no coprecipitant.

As can be seen from the graphs, the most effective treatment is realized with the use of a coprecipitant. In the case of $Na_2SiO_3$, it is somewhat more effective to add the $Na_2SiO_3$ before lowering the pH, although adding it after lowering the pH is also effective. In the case of $NaAlO_2$, the lowering of the pH before adding the coprecipitant is only marginally less effective.

In furtherance of the experiment, another type of sludge was treated, which included $Cr^{+6}$ but was essentially free of silicate or any other known material which would form or cause to form a precipitate when acidified. Two such sludges are shown in Table VI below which were formed by treating metals with fused commercial salt sold by Kolene Corporation and designated as KQW ™ which is an oxidizing salt containing alkali metal nitrates and nitrites.

TABLE VI

| | |
|---|---|
| Sludge A - | Total carbonate = 40.0%; $NaNO_3$ = 3.8% |
| | $NaNO_2$ = 16.6%; $KNO_3$ = 28.9% |
| | As = N.D.; Ba = N.D.; Cd = N.D.; Cr = 0.0055% |
| | Pb = N.D.; Hg = N.D.; Se = N.D.; Ag = N.D.; |
| | Ni = N.D.; Cu = 0.0008% |
| Sludge B - | Total carbonate = 42.1%; $NaNO_3$ = 3.9%; |
| | $NaNO_2$ = 20.5%; $KNO_3$ = 29.7% |
| | As = N.D.; Ba = N.D.; Cd = N.D.; Cr = 0.12% |
| | Pb = N.D.; Hg = N.D.; Se = N.D.; Ag = N.D.; |
| | Ni = N.D.; Cu = 0.0006% |

N.D. = none detected by analytical means used.

Each of these sludges was made up as 100 gm/L solution. Sludge Solution A represent a concentration of about 5.5 ppm of $Cr^{+6}$ and Sludge Solution B represents about 120 ppm of $Cr^{+6}$. An amount of 3.5 times the stoichiometric amount of sodium dithionite was added to each of the solutions to reduce the $Cr^{+6}$. The treated solutions were allowed to stand overnight after the addition of the sodium dithionite and then filtered through Easton-Dikeman grad 1515 pleated paper. Sludge Solution A had an initial pH of about 11.1 and Sludge Solution B had an initial pH of about 10.7. $H_3PO_4$ was added to each of the solutions to lower the pH to about 7. The total chromium concentration of Sludge Solution A was 0.9 mg per liter and Sludge Solution B was 16 mg per liter. This indicates that merely neutralizing an alkaline solution of $Cr^{+3}$ is not sufficient to assure removal by filtration.

A flocculating agent, Oil Technics of America Super Floc 400 polyelectrolyte was added to Solution B. After filtration, the total chromium was still 14 mg per liter (ppm) representing little change. This further indicates that the chromium is either in solution or in colloidal form even though reduced to $Cr^{+3}$. The experiment was repeated using 100 ml of the solution of Sludge B to which was added 3.5 times the stoichiometric amount of sodium dithionite. Three such samples were prepared and treated as follows:

SAMPLE 1

This sample was neutralized to a pH of about 8.0 with $H_3PO_4$.

SAMPLE 2

In this sample, 0.1 gram of sodium silicate was dissolved and then neutralized to a pH of about 8.0 with $H_3PO_4$.

SAMPLE 3

This sample was neutralized to a pH of about 8.0 with $H_3PO_4$ and had added thereto 0.2 grams of $Ca(NO_3)_2 \cdot 4H_2O$ (calcium nitrate).

The analyses of the filtrates are shown in Table VII.

TABLE VII

|    | Sample #1 | Sample #2 | Sample #3 |
|----|-----------|-----------|-----------|
| Cr | 53 mg/l   | 57 mg/l   | 2.5 mg/l  |
| Cu | N.D.      | N.D.      | N.D.      |
| Ca | 3 mg/l    | 4 mg/l    | 28 mg/l   |

As shown in Table VII, with no addition of a potential coprecipitant or with the addition of sodium silicate, there is no significant reduction in the chromium level. However, with the addition of the calcium nitrate, there is a significant reduction to 2.5 mg/L. It is believed that the calcium compound acts as a coprecipitant. It is theorized that this produces a precipitate of $Ca_3(PO_4)_2$ which ties up the $Cr^{+3}$. It is not completely understood why the sodium silicate did not work in this case, although it is believed that it is probably due to the relatively small amount which was not enough to form sufficient precipitate to tie up the remaining chromium. The need for adequate amounts of sodium dithionite and of alkali metal silicates is confirmed by additional experiments indicating that more than about 1.0% of sodium silicate relative to the weight of the sludge is required to be effective.

It is believed that other soluble calcium salts such as chlorides and acetates will perform in a similar manner to the nitrate.

A sludge was formed from the treatment of stainless steel in a salt comprised of alkali metal hydroxides and nitrates. This salt is used as a part of a process to generate hard, wear-resistant surfaces. Various tests were performed on this sludge. All the tests included first dissolving 120 gms of the sludge in one liter of water (approximately 1 lb. per gal.). The solution was analyzed as having 56 milligrams per liter of chromium. In various trials and tests conducted with this sludge, it was found that by adding sodium silicate and reducing the pH together with the addition of sodium dithionite the chromium could be significantly decreased and in one case to as low as 0.76 mg/L (0.76 ppm).

Treatments of sludges, formed by treating various metals with other commercial salt baths, containing alkali metal hydroxides, and oxidizing agents such as nitrates, nitrites, and permanganates showed similar results.

As indicated above, it is not known exactly what the effect of various other constituents in the sludge is upon the removal of chromium. For example, in the presence of manganese as manganate or permanganate ions or manganese oxides, it appears that additional amounts of sodium dithionite over and above those which one would expect to reduce $Cr^{+6}$ to $Cr^{+3}$ may be required. Further, it is possible that certain anions have some effect on causing the reduced $Cr^{+3}$ to go into solution or form a colloid rather than to precipitate. However, the exact action of various constituents is not known. Nevertheless, it appears that there is usually a significant amount of $Cr^{+3}$ in solution or colloidal form which cannot be removed by filtering of the treated effluent which contains reduced chromium. Thus, the present invention provides a technique in which a coprecipitate is formed which will tie up the reduced chromium as a separable precipitate preventing it from passing through the filtering medium and thus allowing an extremely low value to be present in the final effluent.

Although several embodiments of this invention have been shown and described, various adaptations and modifications can be made without departing from the scope of the invention as defined in the appended claims.

Having thus described the preferred embodiment, the invention is now claimed to be:

1. A method of removing $Cr^{+6}$ ions from an alkaline solution having a pH of at least about 10 or higher comprising the steps of:
    adding to the alkaline solution an effective amount of an alkali metal dithionite to reduce the $Cr^{+6}$ toe $Cr^{+3}$, said $Cr^{+3}$ being formed at least in part in colloidal or soluble form;
    providing in said solution a soluble coprecipitant selected from the group consisting of silicates and aluminates which will form a precipitate at reduced pH from that of the alkaline solution, and which precipitate will tie up said colloidal or soluble $Cr^{+3}$ as a coprecipitated material;
    lowering the pH of the solution to between about 7.0 and about 9.5; and,
    thereafter removing said coprecipitated material from the solution.

2. The method as defined in claim 1 wherein said soluble coprecipitant is a silicate.

3. The method as defined in claim 2 wherein said silicate is an alkali metal silicate.

4. The method as defined in claim 2 wherein said silicate is sodium silicate.

5. The method as defined in claim 1 wherein said soluble coprecipitant is an aluminate.

6. The method as defined in claim 5 wherein the aluminate is an alkali metal aluminate.

7. The method as defined in claim 5 wherein the aluminate is sodium aluminate.

8. The method as defined in claim 1 wherein the pH of said solution is lowered subsequent to the addition of the dithionite.

9. The method as defined in claim 8 wherein the pH is lowered with sulfuric acid.

10. The method as defined in claim 8 wherein the pH is lowered subsequent to the addition of the coprecipitant.

11. The method of claim 1 wherein the $Cr^{+3}$ in said coprecipitated material is essentially non-leachable in neutral or mildly acidic solutions.

12. The method as defined in claim 1 wherein both the alkali metal dithionite and the soluble coprecipitant are added as additives to said alkaline solution of $Cr^{+6}$.

13. The method as defined in claim 1 wherein the dithionite includes sodium dithionite.

14. The method as defined in claim 13 wherein said soluble coprecipitant is an alkali metal silicate.

15. The method as defined in claim 14 wherein the alkali metal salt is sodium silicate.

16. The method as defined in claim 1 wherein said coprecipitant is provided in said solution prior to the addition of said dithionite.

17. A method of removing $Cr^{+6}$ ions from an alkaline solution having a pH of at least about 10 or higher comprising the steps of:
    adding to the alkaline solution an effective amount of an alkali metal dithionite to reduce the $Cr^{+6}$ to $Cr^{+3}$, said $Cr^{+3}$ being formed at least in part in colloidal or soluble form;

providing in said solution a soluble calcium salt;

adding to the solution an acid which will form a calcium salt precipitate, and which precipitate will tie up said colloidal or soluble $Cr^{+3}$ as a coprecipitate; and, thereafter removing said coprecipitated material from the solution.

18. The method as defined in claim 17 wherein said soluble calcium compound is calcium nitrate.

19. The method as defined in claim 17 wherein the acid is phosphoric acid.

20. The method as defined in claim 17 wherein the soluble calcium compound is calcium nitrate and the acid is phosphoric acid.

* * * * *